United States Patent [19]
Hedly et al.

[11] 4,035,796
[45] July 12, 1977

[54] DEVICE FOR REDUCING UNDESIRED ENERGY CONSUMPTION IN A ROOM PROVIDED WITH HEATING AND/OR AIR CONDITIONING MEANS

[76] Inventors: Sven Hedly, Stamsjovagen 10A, Lerum, Sweden, 443 00; Lars Winhammar, Tappvagen 3, Saltsjo-Boo, Sweden, 132 00

[21] Appl. No.: 601,410

[22] Filed: Aug. 4, 1975

[30] Foreign Application Priority Data

Aug. 6, 1974 Sweden .............................. 7410081

[51] Int. Cl.² ........................................ G08B 19/00
[52] U.S. Cl. .............................. 340/417; 340/222; 340/274 R; 236/1 R; 340/419
[58] Field of Search ............... 340/213 R, 222, 220, 340/274 R, 275, 412, 415, 417, 419, 420; 236/1 R, 1 C

[56] References Cited

U.S. PATENT DOCUMENTS 3,729,735   4/1973   Dageford .......................... 340/419

*Primary Examiner*—Alvin H. Waring

[57] ABSTRACT

Disclosed is a simple apparatus for turning off a heating or air conditioning unit when a door or window is opened. Switches activated by the opening of doors or windows control the operation of a heater or air conditioner through a relay system that doubles as a burglar alarm when an alarm circuit is activated.

6 Claims, 2 Drawing Figures

DEVICE FOR REDUCING UNDESIRED ENERGY CONSUMPTION IN A ROOM PROVIDED WITH HEATING AND/OR AIR CONDITIONING MEANS

BACKGROUND OF THE INVENTION

THe present invention relates to a device for reducing undesired energy consumption in a room provided with heating and/or air conditioning means.

The increased demand for energy and the rise in costs for energy coverage together with an ever larger understanding of the limited resources of conventional energy sources have together set off an intense hunt for energy savings.

SUMMARY OF THE INVENTION

An object of the present invention is to provide a control circuit arranged to interrupt the energy supply to heating or cooling means in a room wherein the control circuit is activated, when a window, a door or any other opening provided with a closure element is opened e.g. for airing purposes. A further object of the invention is to provide a device which is as cheap and yet reliable as possible and this is accomplished with a current control circuit arranged in the room and provided with a number of contacts located at closable openings in the room and adapted to be influenced by the position of closure elements arranged in said openings, in such a manner that the contacts when the openings are closed will allow energy supply to the said heating or air conditioning means, while being adapted to break said energy supply when one or more of said closure elements is opened, said contacts when breaking said energy supply further being adapted to close an alarm activating circuit provided with an alarm activating switch and arranged to activate an alarm apparatus in said alarm circuit provided the alarm activating switch is closed.

In this manner a current control circuit is obtained, which circuit has a combined function as a reducer of energy consumption and an alarm device and due to this combination the result obtained can compete from cost aspects with corresponding circuits intended for alarm purposes only.

BRIEF DESCRIPTION OF THE DRAWINGS

The invention will hereinafter be further described in connection to two different embodiments shown in block diagram on the accompanying drawings. It deserves to be mentioned that the embodiments shown are to be considered as examples of a number of possible connections.

DETAILED DESCRIPTION OF A PREFERRED EMBODIMENT

Figure 1:
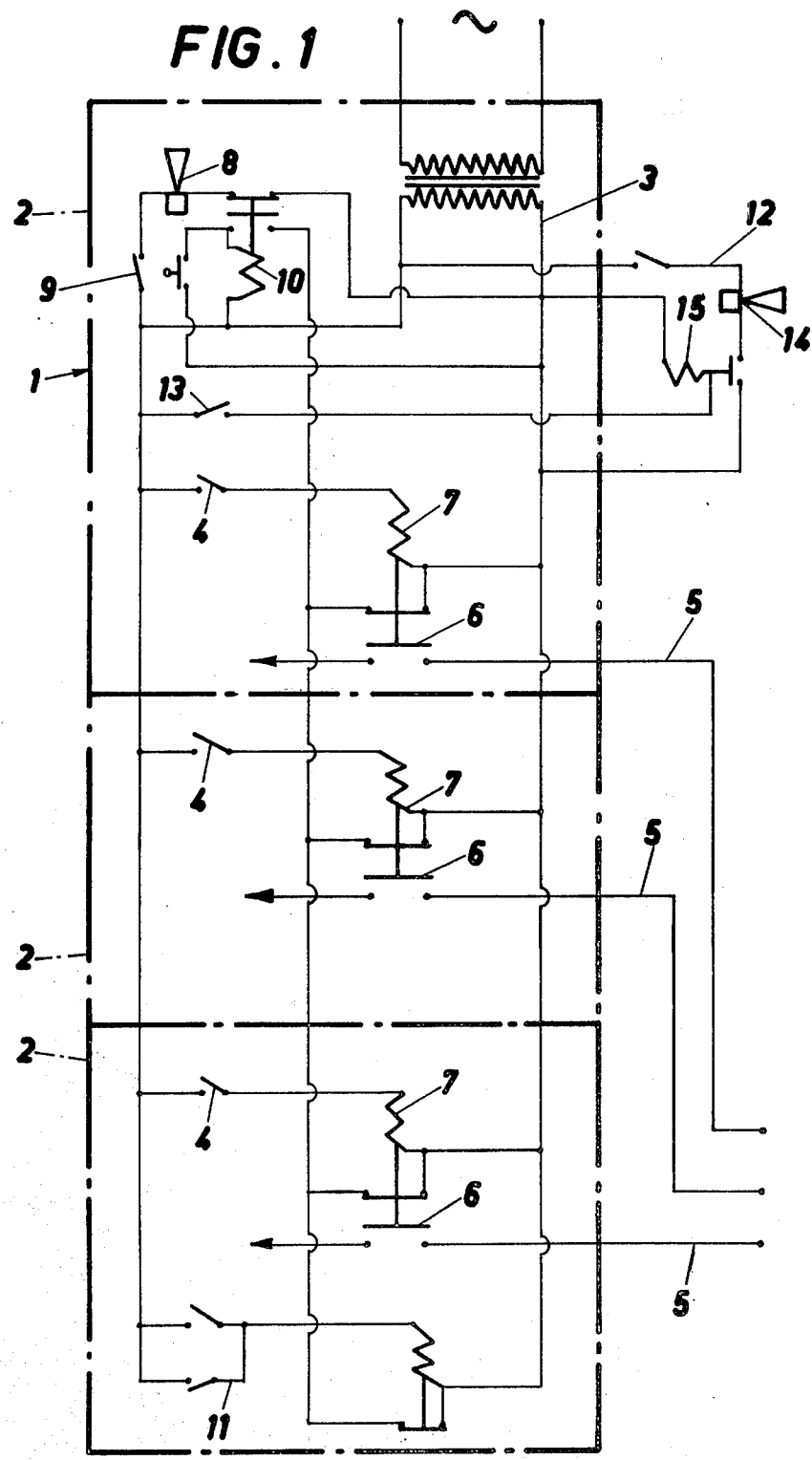
FIG. 1 shows an embodiment of the device according to the invention fitted to three rooms located side by side.

FIG. 1 intimates in dash and dot lines a building 1 having three rooms 2. A current control circuit 3, which is preferably fed with a light current, is arranged to pass through all rooms 2 of the building 1. At closable openings such as windows, doors or the like in these rooms there are arranged a contact 4 for each of said openings, which contacts 4 are connected in the control circuit 3 and adapted to be actuated mechanically or in other suitable way by the position of closure elements in said openings, which elements may be windows, doors or the like.

In the embodiment shown in FIG. 1 each of the contacts 4 is arranged to be closed when the pertaining door or the ike like in its closed position, whereas it, when the door is opened, interrupts the circuit of which the contact is a part. The building at the embodiment shown in FIG. 1 is equipped with an electric heating system fed from a three-phase network, which via supply lines 5 feed electric heating radiators in each one of the rooms. In the supply line 5 for each room there is arranged a switch 6 which is controlled by a relay 7, influenced by the contacts 4 in the pertaining room, thus that the relay, when the contacts are in their closed state, is operated and allows energy supply to the heating means of the room via the supply line 5 and the switch 6, whereas the relay 7 when any of the contacts in the room is open is in its off state, whereby the switch 6 is open and renders energy supply to said heating means impossible. The relay 7 in this state, when energy supply is interrupted, closes an alarm circuit in which is connected an alarm device 8 adapted to release an alarm signal when any of the contacts 4 is opened. This alarm circuit also comprises a manually adjustable alarm activating switch 9, and furthermore an impulse a holding relay 10 adapted to maintain the alarm circuit under activation even after a very short activating pulse.

The relays 7 have for the sake of clarity in the drawing been shown as located inside the corresponding room 2, but they are preferably all positioned in a common site, e.g. the distribution box of the building.

In the embodiment shown a control unit comprising a contact 4, a switch 6 and a relay 7 has furthermore been shown as serving a single room, but the control unit can be arranged to control one room, a number of rooms or even a portion of a room only.

With the control circuit as thus illustrated it is possible highly to reduce unuseful energy consumption, which otherwise will occur, when for instance a window is opened for airing purposes near a thermostatic relay controlling a heating means. Where the specified control circuit according to the invention is not at hand, the room, which is supposed to be warmer than the ambient atmosphere, will lose heat through the open window and the thermostatic relay will continue to give order for increased heat supply in attempt to maintain the temperature level set in the particular room. With the control circuit according to the invention it is to be observed that the energy supply to the heating means will be interrupted during the entire airing operation and the heat supply will be continued immediately when the window or windows in question are again closed. In this manner all unnecessary energy supply is avoided. This is true independent of the fact if the means, as in the case described, is adapted to heat the room or if the intention is to cool the room or to condition the air of the room in other manner. The alarm circuit being a part of the control circuit entails furthermore a reliable alarm device which allows the release of an alarm at the alarm apparatus 8 of the circuit as soon as a window, a door, or any other opening in any of the rooms is opened. The alarm activating switch 9 makes it possible to disconnect the alarm when so desired and the impulse relay 10 of the circuit will allow a proper alarm to be obtained even if a door or a window is only opened a bit and thereupon is closed again, said alarm is then lasting until it is interrupted by switching it off by actuation of the switch 9.

In order to allow the opening from outside of a door when the correct key is used without causing the alarm to start there is arranged a by pass connection 11.

In the control circuit there is also arranged an alarm circuit adapted to be actuated in case of fire. This circuit 12 comprises sensing members 13 which for instance can be connected in series with the contacts 4 in the windows, and which sensing members are arranged to react for temperature rise above a certain level, for smoke or the like. In this circuit 12 there is arranged an alarm apparatus 14 adapted to be connected to the circuit by means of a relay 15 upon impulse from the sensing members 13.

Figure 2:
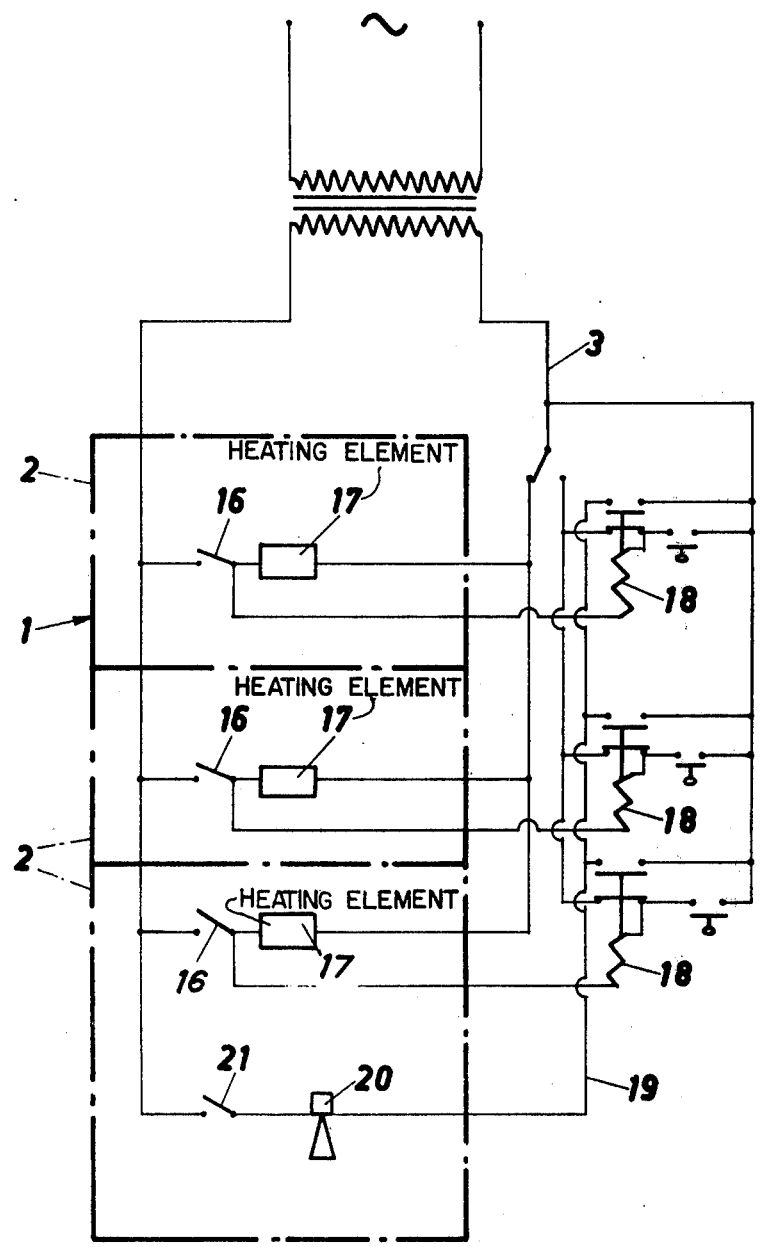
FIG. 2 is a modified embodiment of the invention which also is shown as fitted at a building having three rooms.

FIG. 2 shows a modified embodiment of the device according to the invention. The device is — as in the embodiment shown in FIG. 1 — fitted to a building 1 having three rooms 2. Through each of these three rooms 2 leads a current control circuit 3, which is fed from an external current source, preferably with a light current. At the windows, doors and other closable openings of each room there are arranged contacts 16, adapted to be actuated, preferably mechanically, by the position of closing elements in the openings. In the embodiment shown the device is arranged in such a manner that the contacts 16 are in open state when the openings are closed, whereas a contact when a pertaining door or the like is opened closes a circuit whereby a heating element 17 connected in said circuit is fed with a current causing it to emit heat for releasing a thermostatic relay in the heating means (said thermostatic relay not being shown in the drawing). At the same time as the contact 16 connects the heating element 17, which causes interruption of the energy supply to the room, a circuit including a relay 18 is closed, said relay 18 when connected being operated thereby switching in an alarm activation circuit 19 having an alarm apparatus 20 and an alarm activation switch 21.

In the same manner as described in connection to FIG. 1 the opening of a window or a door results therein that the contacts 16 hereby actuated will cause a disconnection of the energy supply to the room. The disconnection is in this case effected via heat generation in a small heating element, which in turn actuates the thermostatic relay of the heating means, but the result obtained is the same as in the embodiment according to FIG. 1. It is further to be considered that if the alarm activation switch 21 is on, the opening of a door, a window or the like will result in an alarm. A fire alarm can easily be inserted in the specified circuit in the same manner as described in connection to FIG. 1.

Modifications are of course possible within the scope of the appended claims. Thus it is possible instead of breaking the current supply to radiators of electrically heated rooms, to break the current supply to a feed water pump in a heating arrangement with waterborn heat. The specification has only dealt with heat supply to a room but supply of cold, moisture or the like is equal to heat supply from energy supply aspects.

We claim:

1. A device for reducing undesired energy consumption in a room provided with heating and/or air conditioning means, characterized by an electric control circuit (3) arranged in the room and provided with a number of contacts (4; 16) located at closable openings in the room and adapted to be influenced by the position of closure elements arranged in said openings, in such a manner that the contacts when the openings are closed will allow energy supply to the said heating or air conditioning means, while being adapted to break said energy supply when one or more of said closure elements is opened, said contacts when breaking said energy supply further being adapted to close an alarm activating circuit provided with an alarm activating switch (9; 21) and arranged to activate an alarm apparatus (8; 20) in said alarm circuit provided the alarm activating switch is closed.

2. A device according to claim 1, characterized thereby, that each contact (4) is adapted to influence a relay (7) to allow current supply to means for direct or indirect energy supply, when the closing elements are in closed state, the relay further being adapted to close the alarm activation circuit in its second, alternative position.

3. A device according to claim 1, characterized thereby, that each contact (16) is adapted to actuate an electric circuit having an electric heating element (17), whereby the heating element (17), when one or more of the closing elements is opened, is arranged to emit heat for releasing a thermostatic relay of the heating device.

4. A device according to claim 1, characterized thereby, that the alarm activation circuit includes an impulse relay (10) adpated to maintain the said circuit in a closed state after a very short activation impulse.

5. A device according to claim 1, characterized thereby that the current control circuit (3) includes a part circuit (12) connected to a further alarm apparatus (14) which is under actuation of sensing members (13) preferably located in series with said contacts (4; 16) and adapted to produce an alarm activation impulse when sensing an elevated temperature, smoke or the like in order to give a fire alarm.

6. A device according to claim 1, characterized thereby, that the current control circuit (3) is common for a number of rooms (2), which is each provided with its own contacts (4; 16) and actuation means (7; 17) influenced by said contacts, whereas the circuit includes only one burgler alarm device (8–10; 18–21) common for all rooms (2).

* * * * *